United States Patent Office 3,394,125
Patented July 23, 1968

3,394,125
2-PHENYL-3-TERTIARY-AMINOALKOXY PHENYL-AND CORRESPONDING TERTIARYAMINOALKYL THIO BENZOFURANS SUBSTITUTED IN THE BENZO NUCLEUS WITH AN ALKOXY OR TERTIARYAMINO ALKOXY OR ALKYLTHIO GROUP
Ronnie R. Crenshaw, De Witt, N.Y., assignor to Bristol-Myers Company, New York, N.Y., a corporation of Delaware
No Drawing. Filed Oct. 23, 1965, Ser. No. 504,053
10 Claims. (Cl. 260—326.5)

ABSTRACT OF THE DISCLOSURE

Substituted benzofurans are useful as oral antifertility agents and for controlling the animal population.

This invention relates to novel compounds. More particularly, this invention relates to novel compounds which possess antifertility activity and are useful as oral antifertility agents and for controlling the animal population. In another aspect, this invention relates to processes and intermediates useful in the preparation of the novel compounds. In still another aspect, this invention relates to a novel method of inhibiting pregnancy and to a novel method of controlling the animal population.

It is an object of this invention to provide a new class of chemical compounds. It is another object of the present invention to provide novel compounds having antifertility activity. It is a further object of the present invention to provide a novel method of inhibiting pregnancy. It is still a further object of the present invention to provide a novel method of controlling the animal population.

These and other objects which may appear as the specification proceeds are achieved by this invention which comprises the provision of compounds selected from the group consisting of compounds having the following formula (I) 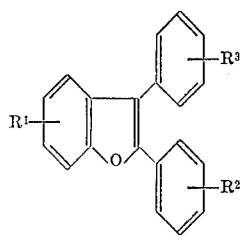

wherein $R^1$, $R^2$ and $R^3$ each represent a member selected from the group consisting of hydrogen, chloro, bromo, iodo, fluoro, trifluoromethyl, (lower)alkyl, (lower)alkoxy, di(lower)alkylamino, di(lower)alkylsulfamyl, (lower)alkanoyl, (lower)alkanoylamido, phenyl, phenoxy, benzyl, cycloalkyl radicals having from 5 to 7 carbon atoms inclusive, and a radical of the formula (II) 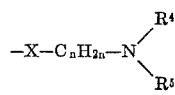

wherein:
$n$ is a whole integer from 1 to 6 inclusive, $R^4$ and $R^5$ each represent a member selected from the group consisting of (lower)alkyl, (lower)alkenyl, (lower)alkynyl, phenyl, phenyl(lower)alkyl, cycloalkyl radicals having from 3 to 7 carbon atoms inclusive, and when taken together with —N<, constitute a heterocyclic ring selected from the group consisting of pyrrolidino, (lower)alkylpyrrolidino, di(lower)alkylpyrrolidino, piperidino, (lower)alkylpiperidino, di(lower)alkylpiperidino, morpholino, (lower)alkylmorpholino, di(lower)alkylmorpholino, tetrahydropyridino, (lower)alkyltetrahydropyridino, di(lower)alkyltetrahydropyridino, N'-(lower)alkylpiperazino, N'-(lower)alkyl-(lower)alkylpiperazino, N'-(lower)alkyl - di(lower)alkylpiperazino, hexamethyleneimino, (lower)alkylhexamethyleneimino, di(lower)alkylhexamethyleneimino; X is a member selected from the group consisting of oxygen and sulfur;
provided that at least one $R^1$, $R^2$ and $R^3$ is a radical of the formula

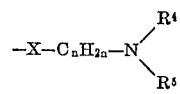

wherein X, $n$, $R^4$ and $R^5$ are as defined.

Also considered within the scope of this invention are the pharmaceutically acceptable nontoxic salts of the compounds of Formula I. The pharmaceutically acceptable nontoxic salts includes the organic and inorganic acid addition salts, e.g., those prepared from acids such as hydrochloric, sulfuric, sulfonic, tartaric, fumaric, hydrobromic, glycolic, citric, maleic, phosphoric, succinic, acetic, nitric and the like. Such salts are prepared by conventional methods.

The term "(lower)alkyl" as used herein means both straight and branched chain alkyl radicals containing from 1 to 8 carbon atoms, e.g. methyl, ethyl, propyl, isopropyl, butyl, isobutyl, t-butyl, amyl, hexyl, 2-ethylhexyl, etc.

The term "(lower)alkenyl" as used herein means both straight and branched chain alkenyl radicals containing from 2 to 8 carbon atoms, e.g. ethenyl, allyl, 1-propenyl, 1-butenyl, 3-butenyl, 2-methyl-1-propenyl, 3-pentenyl, 1-hexenyl, 7-octenyl, etc.

The term "(lower)alkynyl" as used herein means both straight and branched chain alkynyl radicals containing from 2 to 8 carbon atoms, e.g. ethinyl, propargyl, 1-butinyl, 2-butinyl, 1,1-dimethylpropargyl, 1-pentinyl, 1-heptinyl, etc.

Similarly, where the term "(lower)" is used as part of the description of another group, e.g. (lower)alkoxy, it refers to the alkyl portion of such group which is therefore as described in connection with (lower)alkyl.

Thus, the compounds of the present invention are those having the following formulae (III) 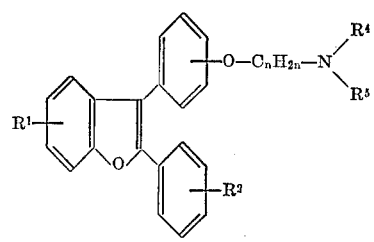

(IV) 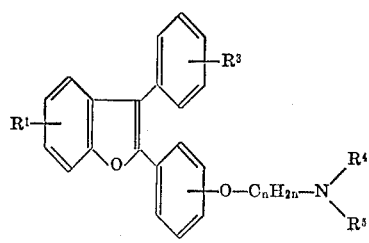

(V) 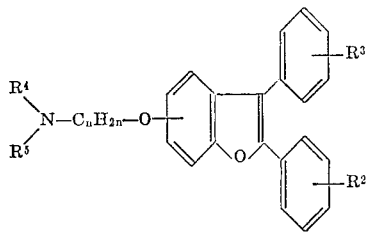

(VI) 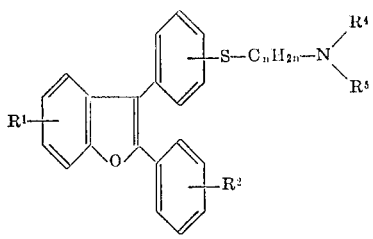

(VII) 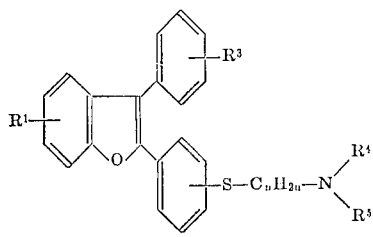

(VIII) 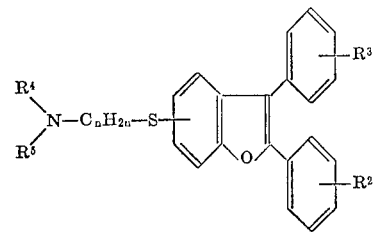

wherein $n$, $R^1$, $R^2$, $R^3$, $R^4$ and $R^5$ are as defined above.

The compounds of the present invention are valuable pharmaceutical agents. They possess antifertility activity, and are orally active antifertility agents in mammals. The compounds of this invention are also useful in controlling the animal population, for example, mice.

The compounds of the present invention are prepared by the following series of reactions:

Step A.—A ketone of the formula (IX) 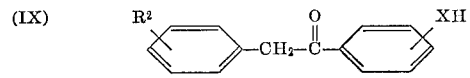

wherein $R^2$ and X are as described above, is reacted with a halo(lower)alkyl p-toluenesulfonate of the formula (X) 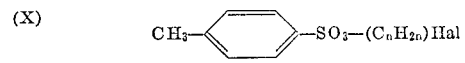

wherein $n$ is as described above, and Hal is chloro, bromo or iodo, but preferably chloro, in the presence of a base, e.g., sodium hydroxide, and a non-reactive solvent, e.g. toluene to produce a ketone of the formula (XI) 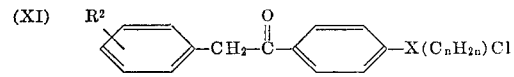

wherein $R^2$, $n$ and X are as described above.

Step B.—The ketone prepared in Step A is treated with bromine, chlorine, iodine, N-bromosuccinimide, N-chlorosuccinimide, sulfuryl chloride, cupric bromide or the like, but preferably cupric bromide in a non-reactive solvent, e.g., ethyl acetate to produce an α-halo ketone of the formula (XII) 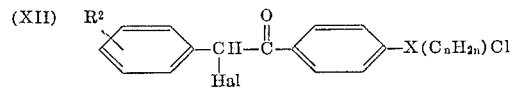

wherein Hal, $R^2$, X and $n$ are as described above.

Step C.—A phenol of the formula (XIII) 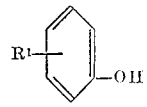

wherein $R^1$ is as described above, in a solvent, e.g., dimethylformamide, is added to a solution of sodium hydride in a solvent, e.g., dimethylformamide, and then reacted with the α-halo ketone prepared in Step B, in the presence of a non-reactive solvent, e.g., benzene, and heated at reflux temperature to produce a ketone of the formula (XIV) 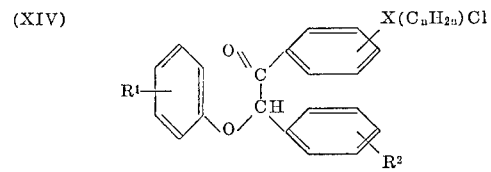

wherein $R^1$, $R^2$, X and $n$ are as described above.

Step D.—The ketone prepared in Step C is cyclized by treatment with a Lewis acid, such as hydrogen fluoride, aluminum chloride, ferric chloride, zinc chloride, phosphoric pentoxide, polyphosphoric acid and the like, to produce a benzofuran of the formula (XV) 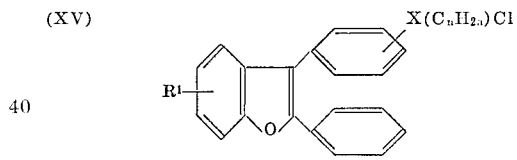

Step E.—The benzofuran prepared in Step D is reacted with an amine of the formula (XVI) 

wherein $R^4$ and $R^5$ are as described above, to produce the compounds of Formula I, having the formula (XVII) 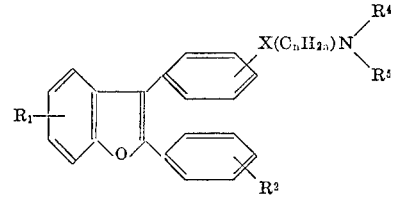

wherein $R^1$, $R^2$, $R^4$, $R^5$, $n$ and X are as described above.

For the preparation of the compounds of Formula I, wherein $R^2$ is the basic side chain, i.e., (XVIII) 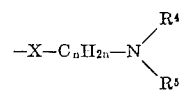

wherein $R^4$, $R^5$, $n$ and X are as described above, it is preferable to use as the starting material in Step A, a ketone having the formula (XIX) 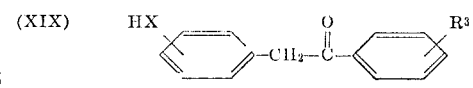

wherein X and R³ are as described above. For the preparation of the compounds of Formula I wherein both R² and R³ are the basic side chain, a compound of the formula (XX) 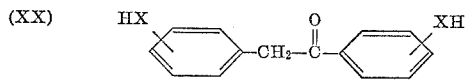

wherein X is as described above, is preferably used as the starting material. In preparing the compounds of Formula I wherein both R² and R³ are substituents other than the basic side chain, Step A is omitted and a ketone having the formula (XXI) 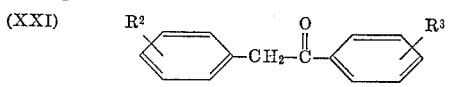

wherein R² and R³ are as described above, but not

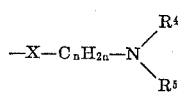

is used as the ketone starting material in Step B.

The starting materials used in the processes described herein are compounds which are either commercially available, well known in the art, or easily prepared in accordance with standard organic procedures previously described in the chemical literature.

For example, benzyl p-hydroxyphenyl ketone is commercially available, and methods for the preparation of other ketones used as starting materials in Step A are described in the literature, for example, p-hydroxy benzyl phenyl ketone is described in Bull. Soc. Chim. Fr., p. 480, 1947. Many methods for the preparation of the ketones having the formula (XXII) 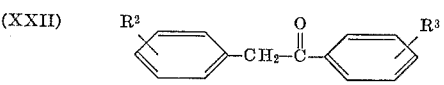

wherein R² and R³ are as described above, are described in the literature. For example, the ketones may be prepared by reacting a phenylacetyl halide of the formula (XXIII) 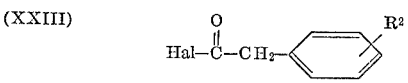

wherein Hal and R² are as described above, with a compound of the formula (XXIV) 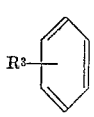

wherein R³ is as described above, in the presence of a Lewis acid with or without an inert solvent, e.g. carbon disulfide, nitrobenzene and the like.

The compounds of this invention may be compounded and formulated into pharmaceutical preparations in unit dosage form for oral administration with organic or inorganic solid materials or liquids which are pharmaceutically acceptable carriers. The compositions may take the form of tablets, powder granules, capsules, suspensions, solutions and the like. Such compositions are considered within the scope of this invention.

The compositions of this invention when administered orally, in an effective amount, are effective in the inhibition of pregnancy. The usual daily dosage is from about 1.0 to 200 mgm./kg.

The following examples will serve to illustrate the invention described herein without unduly restricting it.

Example 1.—Preparation of benzyl p-(2-chloroethoxy)phenyl ketone

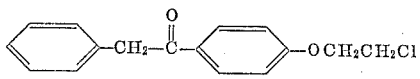

A mixture of sodium hydroxide (3.46 gm.), benzyl p-hydroxyphenyl ketone (15.93 gm.) and 2-chloroethyl p-toluenesulfonate (20.3 gm.) in toluene (150 ml.) was stirred under reflux for 14.5 hours with provision for removal of water.

The cooled mixture was washed in succession with aqueous caustic, water, and saturated brine solution. Removal of the solvent left an oil which was crystallized from toluene; yielding 14.70 gm. of benzyl p-(2-chloroethoxy)phenyl ketone, M.P. 98–103° C. Further recrystallization gave M.P. 105–107.5° C.

Analysis.—Calc'd for $C_{16}H_{15}ClO_2$, Cl, 12.90. Found: Cl, 12.77.

Example 2.—Preparation of α-bromobenzyl p-(2-chloroethoxy)phenyl ketone

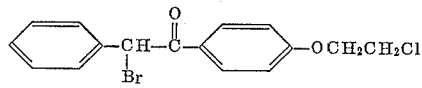

A solution of benzyl p-(2-chloroethoxy)phenyl ketone (14.7 gm.) in chloroform (160 ml.) was added to a suspension of cupric bromide (24.5 gm.) in ethyl acetate (160 ml.). The mixture was stirred under reflux for three hours, then filtered.

The filtrate was concentrated and then diluted with "Skellysolve B" to give crystalline solid α-bromobenzyl p-(2-chloroethoxy)phenyl ketone, M.P. 93.5–101° C.

Example 3.—Preparation of p-(2-chloroethoxy)phenyl α-(m-methoxyphenoxy)benzyl ketone

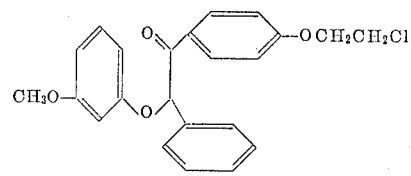

A solution of m-methoxyphenol (4.05 gm.) in dimethylformamide (50 ml.) was added slowly to a cold suspension of sodium hydride dispersion (one equivalent) in dimethylformamide (50 ml.). When the reaction was complete, a solution of α-bromobenzyl p-(2-chloroethoxy)phenyl ketone (11.50 gm.) in benzene (100 ml.) was added and the mixture was heated under reflux for 16 hours.

The solvent was removed and the residue was dissolved in a mixture of benzene and ether. The solution was washed with aqueous caustic and water, and then was dried. The solvent was replaced by acetonitrile; the resultant solution was extracted several times with "Skellysolve B." Removal of the acetonitrile gave p-(2-chloroethoxy)phenyl α-(m-methoxyphenoxy)benzyl ketone as an oil, 12.90 gm.

Analysis.—Calc'd for $C_{23}H_{21}ClO_4$: Cl, 8.93. Found: Cl, 8.71.

Example 4.—Preparation of 3-[p-(2-chloroethoxy)phenyl]-6-methoxy-2-phenylbenzofuran

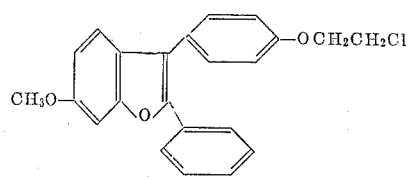

A mixture of p-(2-chloroethoxy)phenyl α-(m-methoxyphenoxy)benzyl ketone (10.1 gm.) and polyphosphoric acid (563 gm.) was stirred at 94–108° C. for 3.75 hours. The cooled mixture was poured onto ice, and the resultant solution extracted with benzene. The organic extracts were washed in succession with water, aqueous sodium bicarbonate and saturated brine solution. Removal of the dried solvent gave 3-[p-(2-chloroethoxy)phenyl]-6-methoxy-2-phenylbenzofuran in the form of an oil (7.6 gm.) which was cyrstallized from acetonitrile, M.P., 97.5–100° C.

Example 5.—Preparation of 6 - methoxy - 3 - {p - [2-(N-pyrrolidyl)ethoxy]phenyl}-2-phenylbenzofuran hydrochloride

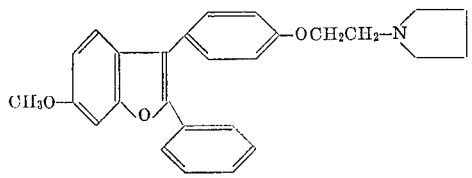

A solution of 3-[p-(2-chloroethoxy)phenyl]-6-methoxy-2-phenylbenzofuran (1.25 gm.) in pyrrolidine (10 ml.) was heated under reflux for three hours.

Excess pyrrolidine was removed and the residue was dissolved in benzene. The benzene solution was extracted with aqueous hydrochloric acid (1 N), and the acid extracts then were extracted with chloroform. Drying and evaporation of the combined chloroform extracts left a white solid 6 - methoxy - 3 - {p-[2-(N-pyrrolidyl)ethoxy]phenyl}-2-phenylbenzofuran hydrochloride (1.12 gm.) which was recrystallized from isopropyl alcohol, M.P. 210–213° C.

*Analysis.*—Calc'd for $C_{27}H_{27}NO_3 \cdot HCl$: C, 72.20; H, 6.23; N, 3.01. Found: C, 72.36; H, 6.49; N, 3.13.

Example 6

When, in the procedure of Example 3, m-methoxyphenol is replaced by an equal molar amount of o-methoxyphenol,
p-methoxyphenol,
p-chlorophenol,
m-bromophenol,
m-trifluoromethylphenol,
o-methylphenol,
p-propylphenol,
m-hexylphenol,
o-isopropylphenol,
p-ethylphenol,
m-chlorophenol,
o-fluorophenol,
p-ethoxyphenol,
m-dimethylaminophenol,
p-iodophenol,
m-hydroxyphenol,
m-dimethylsulfamylphenol,
p-acetylphenol,
m-phenylphenol,
p-phenoxyphenol,
m-cyclopropylphenol,
o-cyclohexylphenol,
p-benzylphenol,
m-[2-(1-pyrrolidyl)ethoxy]phenol,
p-[2-(1-pyrrolidyl)ethoxy]phenol,
m-(2-N,N-dimethylaminoethoxy)phenol,
p-(3-N,N-diethylaminopropoxy)phenol,
m-(2-N,N-diethylaminoethoxy)phenol,
p-(2-N,N-diethylaminoethoxy)phenol,
o-(2-N,N-diallylaminoethoxy)phenol,
p-(2-N,N-dibutinylaminoethoxy)phenol,
m-(2-N,N-dibenzylaminoethoxy)phenol,
p-(2-N,N-diphenylaminoethoxy)phenol,
p-(2-N-cyclopropyl-N-phenylaminoethoxy)phenol,
m-(2-N,N-dicyclohexylaminoethoxy)phenol,
m-[2-(1-piperidino)ethoxy]phenol,
p-[2-(1-2-methylpyrrolidyl)ethoxy]phenol,
m-[2-(1-2,4-diethylpyrrolidyl)ethoxy]phenol,
p-[2-(1-4-methylpiperidino)ethoxy]phenol,
o-[2-(1-2,4-diethylpiperidino)ethoxy]phenol,
o-[2-(4-morpholino)ethoxy]phenol,
m-[2-(4-3-methylmorpholino)ethoxy]phenol,
p-[4-(4-2,6-dimethylmorpholino)butoxy]phenol,
p-[2-(1-1,2,5,6-tetrahydropyridino)ethoxy]phenol,
o-(1-4-methyl-1,2,5,6-tetrahydropyridinomethoxy)phenol,
m-[2-(1-4-methylpiperazino)ethoxy]phenol,
p-[2-(1-2,4-dimethylpiperazino)ethoxy]phenol,
p-[2-(1-2-methylhexamethyleneimino)ethoxy]phenol,
p-[2-(1-pyrrolidyl)ethylthio]phenol,
m-[2-(1-pyrrolidyl)ethylthio]phenol,
p-(2-N,N-dimethylaminoethylthio)phenol, and
p-trifluoromethylphenol, there are obtained, p-(2-chloroethoxy)phenyl α-(2-methoxyphenyl)benzyl ketone,
p-(2-chloroethoxy)phenyl α-(4-methoxyphenyl)benzyl ketone,
p-(2-chloroethoxy)phenyl α-(4-chlorophenyl)benzyl ketone,
p-(2-chloroethoxy)phenyl α-(3-bromophenyl)benzyl ketone,
p-(2-chloroethoxy)phenyl α-(3-trifluoromethylphenyl)benzyl ketone,
p-(2-chloroethoxy)phenyl α-(2-methylphenyl)benzyl ketone,
p-(2-chloroethoxy)phenyl α-(4-propylphenyl)benzyl ketone,
p-(2-chloroethoxy)phenyl α-(3-hexylphenyl)benzyl ketone,
p-(2-chloroethoxy)phenyl α-(2-isopropylphenyl)benzyl ketone,
p-(2-chloroethoxy)phenyl α-(4-ethylphenyl)benzyl ketone,
p-(2-chloroethoxy)phenyl α-(3-chlorophenyl)benzyl ketone,
p-(2-chloroethoxy)phenyl α-(2-fluorophenyl)benzyl ketone,
p-(2-chloroethoxy)phenyl α-(4-ethoxyphenyl)benzyl ketone,
p-(2-chloroethoxy)phenyl α-(3-dimethylaminophenyl)benzyl ketone,
p-(2-chloroethoxy)phenyl α-(4-iodophenyl)benzyl ketone,
p-(2-chloroethoxy)phenyl α-(3-hydroxyphenyl)benzyl ketone,
p-(2-chloroethoxy)phenyl α-(3-dimethylsulfamylphenyl)benzyl ketone,
p-(2-chloroethoxy)phenyl α-(4-acetylphenyl)benzyl ketone,
p-(2-chloroethoxy)phenyl α-(3-phenylphenyl)benzyl ketone,
p-(2-chloroethoxy)phenyl α-(4-phenoxyphenyl)benzyl ketone,
p-(2-chloroethoxy)phenyl α-(3-cyclopropylphenyl)benzyl ketone,
p-(2-chloroethoxy)phenyl α-(2-cyclohexylphenyl)benzyl ketone,
p-(2-chloroethoxy)phenyl α-(4-benzylphenyl)benzyl ketone,
p-(2-chloroethoxy)phenyl α-{3-[2-(1-pyrrolidyl)ethoxy]phenyl}-benzyl ketone,
p-(2-chloroethoxy)phenyl α-{4-[2-(1-pyrrolidyl)ethoxy]phenyl}-benzyl ketone,
p-(2-chloroethoxy)phenyl α-[3-(2-N,N-dimethylaminoethoxy)phenyl]-benzyl ketone,
p-(2-chloroethoxy)phenyl α-[4-(3-N,N-diethylaminopropoxy)phenyl]-benzyl ketone,
p-(2-chloroethoxy)phenyl α-[3-(2-N,N-diethylaminoethoxy)phenyl]-benzyl ketone,
p-(2-chloroethoxy)phenyl α-[4-(2-N,N-diethylaminoethoxy)phenyl]-benzyl ketone,
p-(2-chloroethoxy)phenyl α-[2-(2-N,N-diallylaminoethoxy)phenyl]-benzyl ketone,
p-(2-chloroethoxy)phenyl α-[4-(2-N,N-dibutinylaminoethoxy)phenyl]-benzyl ketone,
p-(2-chloroethoxy)phenyl α-[3-(2-N,N-dibenzylaminoethoxy)phenyl]-benzyl ketone, p-(2-chloroethoxy)phenyl α-[4-(2-N,N-diphenylamino-
ethoxy)phenyl]-benzyl ketone,
p-(2-chloroethoxy)phenyl α-[4-(2-N-cyclopropyl-N-
phenylaminoethoxy)phenyl]benzyl ketone,
p-(2-chloroethoxy)phenyl α-[3-(2-N,N-dicyclohexyl-
aminoethoxy)phenyl]benzyl ketone,
p-(2-chloroethoxy)phenyl α-{3-[2-(1-piperidino)ethoxy]
phenyl}-benzyl ketone,
p-(2-chloroethoxy)phenyl α-{4-[2-(1-2-methylpyrrolidyl)
ethoxy]-phenyl}benzyl ketone,
p-(2-chloroethoxy)phenyl α-{3-[2-(1-2,4-diethylpyrroli-
dyl)ethoxy]-phenyl}benzyl ketone,
p-(2-chloroethoxy)phenyl α-{4-[2-(1-4-methylpiperidino)
ethoxy]-phenyl}benzyl ketone,
p-(2-chloroethoxy)phenyl α-{2-[2-(1-2,4-diethylpiper-
idino)ethoxy]-phenyl}benzyl ketone,
p-(2-chloroethoxy)phenyl α-{2-[2-(4-morpholino)eth-
oxy]phenyl}-benzyl ketone,
p-(2-chloroethoxy)phenyl α-{3-[2-(4-3-methylmorpho-
lino)ethoxy]-phenyl}benzyl ketone,
p-(2-chloroethoxy)phenyl α-{4-[4-(4-2,6-dimethyl-
morpholino)-butoxy]phenyl}benzyl ketone,
p-(2-chloroethoxy)phenyl α-{4-[2-(1-1,2,5,6-tetrahydro-
pyridino)-ethoxy]phenyl}benzyl ketone,
p-(2-chloroethoxy)phenyl α-[2-(1-4-methyl-1,2,5,6-
tetrahydropyridinomethoxy)phenyl]benzyl ketone,
p-(2-chloroethoxy)phenyl α-{3-[2-(1-4-methylpiper-
azino)ethoxy]-phenyl}benzyl ketone,
p-(2-chloroethoxy)phenyl α-{4-[2-(1-2,4-dimethylpiper-
azino)ethoxy]-phenyl}benzyl ketone,
p-(2-chloroethoxy)phenyl α-{4-[2-(1-2-methylhexameth-
yleneimino)-ethoxy]phenyl}benzyl ketone,
p-(2-chloroethoxy)phenyl α-{4-[2-(1-pyrrolidyl)ethyl-
thio]phenyl}-benzyl ketone,
p-(2-chloroethoxy)phenyl α-{3-[2-(1-pyrrolidyl)ethyl-
thio]phenyl}-benzyl ketone,
p-(2-chloroethoxy)phenyl α-[4-(2-N,N-dimethylamino-
ethylthio)-phenyl]benzyl ketone and
p-(2-chloroethoxy)phenyl α-(4-trifluoromethylphenyl)
benzyl ketone,
respectively.

Example 7

By replacing p-(2-chloroethoxy)phenyl α-(m-methoxy-
phenoxy)benzyl ketone in Example 4 with an equal molar
quantity of each of the products of Example 6, and carry-
ing out the procedures of Examples 4 and 5, there are
obtained, 7-methoxy-3-{p-[2-(N-pyrrolidyl)ethoxy]phenyl}-2-
phenylbenzofuran,
5-methoxy-3-{p-[2-(N-pyrrolidyl)ethoxy]phenyl}-2-
phenylbenzofuran,
5-chloro-3-{p-[2-(N-pyrrolidyl)ethoxy]phenyl}-2-
phenylbenzofuran,
6-bromo-3-{p-[2-(N-pyrrolidyl)ethoxy]phenyl}-2-
phenylbenzofuran,
6-trifluoromethyl-3-{p-[2-(N-pyrrolidyl)ethoxy]phenyl}-
2-phenylbenzofuran,
7-methyl-3-{p-[2-(N-pyrrolidyl)ethoxy]phenyl}-2-
phenylbenzofuran,
5-propyl-3-{p-[2-(N-pyrrolidyl)ethoxy]phenyl}-2-
phenylbenzofuran,
6-hexyl-3-{p-[2-(N-pyrrolidyl)ethoxy]phenyl}-2-
phenylbenzofuran,
7-isopropyl-3-{p-[2-(N-pyrrolidyl)ethoxy]phenyl}-2-
phenylbenzofuran,
5-ethyl-3-{p-[2-(N-pyrrolidyl)ethoxy]phenyl}-2-
phenylbenzofuran,
6-chloro-3-{p-[2-(N-pyrrolidyl)ethoxy]phenyl}-2-
phenylbenzofuran,
7-fluoro-3-{p-[2-(N-pyrrolidyl)ethoxy]phenyl}-2-
phenylbenzofuran,
5-ethoxy-3-{p-[2-(N-pyrrolidyl)ethoxy]phenyl}-2-
phenylbenzofuran,
6-dimethylamino-3-{p-[2-N-pyrrolidyl)ethoxy]phenyl}-
2-phenylbenzofuran,
5-iodo-3-{p-[2-(N-pyrrolidyl)ethoxy]phenyl}-2-
phenylbenzofuran,
6-hydroxy-3-{p-[2-(N-pyrrolidyl)ethoxy]phenyl}-2-
phenylbenzofuran,
6-dimethylsulfamyl-3-{p-[2-(N-pyrrolidyl)ethoxy]
phenyl}-2-phenylbenzofuran,
5-acetyl-3-{p-[2-(N-pyrrolidyl)ethoxy]phenyl}-2-
phenylbenzofuran,
6-phenyl-3-{p-[2-(N-pyrrolidyl)ethoxy]phenyl}-2-
phenylbenzofuran,
5-phenoxy-3-{p-[2-(N-pyrrolidyl)ethoxy]phenyl}-2-
phenylbenzofuran,
6-cyclopropyl-3-{p-[2-(N-pyrrolidyl)ethoxy]phenyl}-2-
phenylbenzofuran,
7-cyclohexyl-3-{p-[2-(N-pyrrolidyl)ethoxy]phenyl}-2-
phenylbenzofuran,
5-benzyl-3-{p-[2-(N-pyrrolidyl)ethoxy]phenyl}-2-
phenylbenzofuran,
6-[2-(1-pyrrolidyl)ethoxy]-3-{p-[2-(N-pyrrolidyl)
ethoyl]phenyl}-2-phenylbenzofuran,
5-[2-(1-pyrrolidyl)ethoxy]-3-{p-[2-(N-pyrrolidyl)
ethoxy]phenyl}-2-phenylbenzofuran,
6-(2-N,N-dimethylaminoethoxy)-3-{p-[2-(N-pyrrolidyl)
ethoxy]-phenyl}-2-phenylbenzofuran,
5-(3-N,N-diethylaminopropoxy)-3-{p-[2-(N-pyrrolidyl)
ethoxy]-phenyl}-2-phenylbenzofuran,
6-(2-N,N-diethylaminoethoxy)-3-{p-[2-(N-pyrrolidyl)
ethoxy]-phenyl}-2-phenylbenzofuran,
5-(2-N,N-diethylaminoethoxy)-3-{p-[2-(N-pyrrolidyl)
ethoxy]phenyl}-2-phenylbenzofuran,
7-(2-N,N-diallylaminoethoxy)-3-{p-[2-(N-pyrrolidyl)
ethoxy]phenyl}-2-phenylbenzofuran,
5-(2-N,N-dibutinylaminoethoxy)-3-{p-[2-(N-pyrrolidyl)
ethoxy]phenyl}-2-phenylbenzofuran,
6-(2-N,N-dibenzylaminoethoxy)-3-{p-[2-(N-pyrrolidyl)
ethoxy]phenyl}-2-phenylbenzofuran,
5-(2-N,N-diphenylaminoethoxy)-3-{p-[2-N-pyrrolidyl)
ethoxy]phenyl}-2-phenylbenzofuran,
5-(2-N-cyclopropyl-N-phenylaminoethoxy)-3-{p-[2-(N-
pyrrolidyl)ethoxy]phenyl}-2-phenylbenzofuran,
6-(2-N,N-dicyclohexylaminoethoxy)-3-{p-[2-(N-
pyrrolidyl)ethoxy]phenyl}-2-phenylbenzofuran,
6-[2-(1-piperidino)ethoxy]-3-{p-(N-pyrrolidyl)ethoxy]
phenyl}-2-phenylbenzofuran,
5-[2-(1-2-methylpyrrolidyl)ethoxy]-3-{p-[2-(N-
pyrrolidyl)ethoxy]-phenyl}-2-phenylbenzofuran,
6-[2-(1-2,4-diethylpyrrolidyl)ethoxy]-3-{p-[2-(N-
pyrrolidyl)ethoxy]phenyl}-2-phenylbenzofuran,
5-[2-(1-4-methylpiperidino)ethoxy]-3-{p-[2-(N-
pyrrolidyl)ethoxy]phenyl}-2-phenylbenzofuran,
7-[2-(1-2,4-diethylpiperidino)ethoxy]-3-{p-[2-(N-
pyrrolidyl)ethoxy]phenyl}-2-phenylbenzofuran,
7-[2-(4-morpholino)ethoxy]-3-{p-[2-(N-pyrrolidyl)
ethoxy]phenyl}-2-phenylbenzofuran,
6-[2-(4-3-methylmorpholino)ethoxy]-3-{p-[2-(N-
pyrrolidyl)ethoxy]phenyl}-2-phenylbenzofuran,
5-[4-(4-2,6-dimethylmorpholino)butoxy]-3-{p-[2-(N-
pyrrolidyl)ethoxy]phenyl}-2-phenylbenzofuran,
5-[2-(1-1,2,5,6-tetrahydropyridino)ethoxy]-3-{p-[2-(N-
pyrrolidyl)ethoxy]phenyl}-2-phenylbenzofuran,
7-(1-4-methyl-1,2,5,6-tetrahydropyridinomethoxy)-3-
{p-[2-(N-pyrrolidyl)ethoxy]phenyl}-2-phenyl-
benzofuran,
6-[2-(1-4-methylpiperazino)ethoxy]-3-{p-[2-(N-
pyrrolidyl)ethoxy]phenyl}-2-phenylbenzofuran,
5-[2-(1-2,4-dimethylpiperazino)ethoxy]-3-{p-[2-(N-
pyrrolidyl)ethoxy]phenyl}-2-phenylbenzofuran,
5-[2-(1-2-methylhexamethyleneimino)ethoxy]-3-{p-[2-
(N-pyrrolidyl)ethoxy]phenyl}-2-phenylbenzofuran,
5-[2-(1-pyrrolidyl)ethylthio]-3-{p-[2-(N-pyrrolidyl)
ethoxy]phenyl}-2-phenylbenzofuran,
6-[2-(1-pyrrolidyl)ethylthio]-3-{p-[2-(N-pyrrolidyl)
ethoxy]phenyl}-2-phenylbenzofuran, 5-(2-N,N-dimethylaminoethylthio)-3-{p-[2-(N-pyrrolidyl)ethoxy]phenyl}-2-phenylbenzofuran, and
5-trifluoromethyl-3-{p-[2-(N-pyrrolidyl)ethoxy]phenyl}-2-phenylbenzofuran, respectively.

Example 8

When, in the procedure of Example 5, pyrrolidine is replaced by an equal molar amount of N,N-dimethylamine,
N,N-diethylamine,
N,N-diallylamine,
N,N-dibutinylamine,
N,N-dibenzylamine,
N,N-diphenylamine,
N-cyclopropyl-N-phenylamine,
N,N-dicyclohexylamine,
piperidine,
2-methylpyrrolidine,
2,4-diethylpyrrolidine,
4-methylpiperidine,
2,4-diethylpiperidine,
morpholine,
3-methylmorpholine,
2,6-dimethylmorpholine,
1,2,5,6-tetrahydropyridine,
4-methyl-1,2,5,6-tetrahydropyridine,
4-methylpiperazine,
2,4-dimethylpiperazine,
2-methylhexamethyleneimine,
N-cyclopropyl-N-methylamine,
N,N-dicyclopropylamine and
hexamethyleneimine, there are obtained, 6-methoxy-3-{p-[2-(N,N-dimethylamino)ethoxy]phenyl}-2-phenylbenzofuran,
6-methoxy-3-{p-[2-(N,N-diethylamino)ethoxy]phenyl}-2-phenylbenzofuran,
6-methoxy-3-{p-[2-(N,N-diallylamino)ethoxy]phenyl}-2-phenylbenzofuran,
6-methoxy-3-{p-[2-(N,N-dibutinylamino)ethoxy]phenyl}-2-phenylbenzofuran,
6-methoxy-3-{p-[2-(N,N-dibenzylamino)ethoxy]phenyl}-2-phenylbenzofuran,
6-methoxy-3-{p-[2-(N,N-diphenylamino)ethoxy]phenyl}-2-phenylbenzofuran,
6-methoxy-3-{p-[2-(N-cyclopropyl-N-phenylamino)ethoxy]phenyl}-2-phenylbenzofuran,
6-methoxy-3-{p-[2-(N,N-dicyclohexylamino)ethoxy]phenyl}-2-phenylbenzofuran,
6-methoxy-3-{p-[2-(N-piperidino)ethoxy]phenyl}-2-phenylbenzofuran,
6-methoxy-3-{p-[2-(N-2-methylpyrrolidino)ethoxy]phenyl}-2-phenylbenzofuran,
6-methoxy-3-{p-[2-(N-2,4-diethylpyrrolidino)ethoxy]phenyl}-2-phenylbenzofuran,
6-methoxy-3-{p-[2-(N-4-methylpiperidino)ethoxy]phenyl}-2-phenylbenzofuran,
6-methoxy-3-{p-[2-(N-2,4-diethylpiperidino)ethoxy]phenyl}-2-phenylbenzofuran,
6-methoxy-3-{p-[2-(N-morpholino)ethoxy]phenyl}-2-phenylbenzofuran,
6-methoxy-3-{p-[2-(N-3-methylmorpholino)ethoxy]phenyl}-2-phenylbenzofuran,
6-methoxy-3-{p-[2-(N-2,6-dimethylmorpholino)ethoxy]phenyl}-2-phenylbenzofuran,
6-methoxy-3-{p-[2-(N-1,2,5,6-tetrahydropyridino)ethoxy]phenyl}-2-phenylbenzofuran,
6-methoxy-3-{p-[2-(N-methyl-1,2,5,6-tetrahydropyridino)ethoxy]phenyl}-2-phenylbenzofuran,
6-methoxy-3-{p-[2-(N-4-methylpiperazino)ethoxy]phenyl}-2-phenylbenzofuran,
6-methoxy-3-{p-[2-(N-2,4-dimethylpiperazino)ethoxy]phenyl}-2-phenylbenzofuran,
6-methoxy-3-{p-[2-(N-2-methylhexamethyleneimino)ethoxy]phenyl}-2-phenylbenzofuran,
6-methoxy-3-{p-[2-(N-cyclopropyl-N-methylamino)ethoxy]phenyl}-2-phenylbenzofuran,
6-methoxy-3-{p-[2-(N,N-dicyclopropylamino)ethoxy]phenyl}-2-phenylbenzofuran and
6-methoxy-3-{p-[2-(N-hexamethyleneimino)ethoxy]phenyl}-2-phenylbenzofuran, respectively.

Example 9

Using the procedures of Examples 1 through 5 and replacing benzyl p-hydroxyphenyl ketone in Example 1 by an equal molar amount of benzyl o-hydroxyphenyl ketone,
benzyl m-hydroxyphenyl ketone,
benzyl p-mercaptophenyl ketone,
benzyl o-mercaptophenyl ketone,
benzyl m-mercaptophenyl ketone,
o-hydroxybenzyl-phenyl ketone,
m-hydroxybenzyl-phenyl ketone,
p-hydroxybenzyl-phenyl ketone,
o-mercaptobenzyl-phenyl ketone,
m-mercaptobenzyl-phenyl ketone,
p-mercaptobenzyl-phenyl ketone,
p-hydroxybenzyl-p-hydroxyphenyl ketone,
p-mercaptobenzyl-p-mercaptophenyl ketone,
p-mercaptobenzyl-p-hydroxyphenyl ketone,
p-hydroxybenzyl-p-mercaptophenyl ketone,
p-hydroxybenzyl-p-methoxyphenyl ketone,
p-chlorobenzyl-p-hydroxyphenyl ketone,
o-bromobenzyl-p-hydroxyphenyl ketone,
m-fluorobenzyl-p-hydroxyphenyl ketone,
p-trifluoromethylbenzyl-p-hydroxyphenyl ketone,
o-iodobenzyl-p-hydroxyphenyl ketone,
p-methylbenzyl-p-hydroxyphenyl ketone,
p-methoxybenzyl-p-hydroxyphenyl ketone,
m-dimethylaminobenzyl-p-hydroxyphenyl ketone,
p-phenoxybenzyl-p-hydroxyphenyl ketone,
p-benzylbenzyl-p-hydroxyphenyl ketone,
p-cyclopropylbenzyl-p-hydroxyphenyl ketone,
o-dimethylsulfamylbenzyl-p-hydroxyphenyl ketone,
p-acetamidobenzyl-p-hydroxyphenyl ketone,
p-acetylbenzyl-p-hydroxyphenyl ketone,
p-hydroxybenzyl-p-methoxyphenyl ketone,
p-hydroxybenzyl-o-methoxyphenyl ketone,
p-hydroxybenzyl-p-chlorophenyl ketone,
p-hydroxybenzyl-p-methylphenyl ketone and
p-hydroxybenzyl-p-trifluoromethylphenyl ketone, there are obtained, 6-methoxy-3-{o-[2-(N-pyrrolidyl)ethoxy]phenyl}-2-phenylbenzofuran,
6-methoxy-3-{m-[2-(N-pyrrolidyl)ethoxy]phenyl}-2-phenylbenzofuran,
6-methoxy-3-{p-[2-(N-pyrrolidyl)ethylthio]phenyl}-2-phenylbenzofuran,
6-methoxy-3-{o-[2-(N-pyrrolidyl)ethylthio]phenyl}-2-phenylbenzofuran,
6-methoxy-3-{m-[2-(N-pyrrolidyl)ethylthio]phenyl}-2-phenylbenzofuran,
6-methoxy-3-phenyl-2-{o-[2-(N-pyrrolidyl)ethoxy]phenyl}benzofuran,
6-methoxy-3-phenyl-2-{m-[2-(N-pyrrolidyl)ethoxy]phenyl}benzofuran,
6-methoxy-3-phenyl-2-{p-[2-(N-pyrrollidyl)ethoxy]phenyl}benzofuran,
6-methoxy-3-phenyl-2-{o-[2-(N-pyrrolidyl)ethylithio]phenyl}benzofuran,
6-methoxy-3-phenyl-2-{m-[2-(N-pyrrolidyl)ethylthio]phenyl}benzofuran, 6-methoxy-3-phenyl-2-{p-[2-(N-pyrrolidyl)ethylthio] phenyl}benzofuran,
6-methoxy-3-{p-[2-(N-pyrrolidyl)ethoxy]phenyl}-2-{p-[2-(N-pyrrolidyl)ethoxy]phenyl}benzofuran,
6-methoxy-3-{p-[2-(N-pyrrolidyl)ethylthio]phenyl}-2-{p-[2-(N-pyrrolidyl)ethylthio]phenyl}benzofuran,
6-methoxy-3-{p-[2-(N-pyrrolidyl)ethylthio]phenyl}-2-{p-[2-(N-pyrrolidyl)ethoxy]phenyl}benzofuran,
6-methoxy-3-{p-[2-(N-pyrrolidyl)ethoxy]phenyl}-2-{p-[2-(N-pyrrolidyl)ethylthio]phenyl}benzofuran,
6-methoxy-3-(p-methoxyphenyl)-2-{p-[2-(N-pyrrolidyl)ethoxy]phenyl}benzofuran,
6-methoxy-3-{p-[2-(N-pyrrolidyl)ethoxy]phenyl}-2-(p-chlorophenyl)benzofuran,
6-methoxy-3-{p-[2-(N-pyrrolidyl)ethoxy]phenyl}-2-(o-bromophenyl)benzofuran,
6-methoxy-3-{p-[2-(N-pyrrolidyl)ethoxy]phenyl}-2-(m-fluorophenyl)benzofuran,
6-methoxy-3-{p-[2-(N-pyrrolidyl)ethoxy]phenyl}-2-(p-trifluoromethylphenyl)benzofuran,
6-methoxy-3-{p-[2-(N-pyrrolidyl)ethoxy]phenyl}-2-(o-iodophenyl)benzofuran,
6-methoxy-3-{p-[2-(N-pyrrolidyl)ethoxy]phenyl}-2-(p-methylphenyl)benzofuran,
6-methoxy-3-{p-[2-(N-pyrrolidyl)ethoxy]phenyl}-2-(p-methoxyphenyl)benzofuran,
6-methoxy-3-{p-[2-(N-pyrrolidyl)ethoxy]phenyl}-2-(m-dimethylaminophenyl)benzofuran,
6-methoxy-3-{p-[2-(N-pyrrolidyl)ethoxy]phenyl}-2-(p-phenoxyphenyl)benzofuran,
6-methoxy-3-{p-[2-(N-pyrrolidyl)ethoxy]phenyl}-2-(p-benzylphenyl)benzofuran,
6-methoxy-3-{p-[2-(N-pyrrolidyl)ethoxy]phenyl}-2-(p-cyclopropylphenyl)benzofuran,
6-methoxy-3-{p-[2-(N-pyrrolidyl)ethoxy]phenyl}-2-(o-dimethylsulfamylphenyl)benzofuran,
6-methoxy-3-{p-[2-(N-pyrrolidyl)ethoxy]phenyl}-2-(p-acetamidophenyl)benzofuran,
6-methoxy-3-{p-[2-(N-pyrrolidyl)ethoxy]phenyl}-2-p-acetylphenyl)benzofuran,
6-methoxy-3-(m-methoxyphenyl)-2-{p-[2-(N-pyrrolidyl)ethoxy]phenyl}benzofuran,
6-methoxy-3-(o-methoxyphenyl)-2-{p-[2-(N-pyrrolidyl)ethoxy]phenyl}benzofuran,
6-methoxy-3-(p-chlorophenyl)-2-{p-[2-(N-pyrrolidyl)ethoxy]phenyl}benzofuran,
6-methoxy-3-(p-methylphenyl)-2-{p-[2-(N-pyrrolidyl)ethoxy]phenyl}benzofuran and
6-methoxy-3-(p-trifluoromethylphenyl)-2-{p-[2-(N-pyrrolidyl)ethoxy]phenyl}benzofuran, respectively.

Example 10

Similarly, the following compounds are made by the substitution of the proper reactants in Examples 1 through 5:

6-methoxy-3-p-[2-(N,N-dimethylamino)ethylthio] phenyl-2-phenylbenzofuran,
6-methoxy-3-o-[3-(N-pyrrolidyl)propoxy]phenyl-2-phenylbenzofuran,
6-methoxy-3-m-[3-(N-pyrrolidyl)propoxy]phenyl-2-phenylbenzofuran,
6-methoxy-3-p-[3-(N-pyrrolidyl)propoxy]phenyl-2-phenylbenzofuran,
6-methoxy-3-p-[2-(N-pyrrolidyl)propoxy]phenyl-2-phenylbenzofuran,
5-methoxy-3-p-[2-(N,N-diethyl)ethoxy]phenyl-2-phenylbenzofuran,
7-methoxy-3-p-[2-(N,N-diethyl)ethoxy]phenyl-2-phenylbenzofuran,
6-(N-pyrrolidyl)-3-p-[2-(N-pyrrolidyl)ethoxy]phenyl-2-[p-(N-pyrrolidyl)phenyl]benzofuran.

Thus, it is apparent from the foregoing description that the objects of this invention have been attained. Novel compounds have been invented which have antifertility activity and inhibit pregnancy. In addition, a novel method of inhibiting pregnancy has been described.

While this invention has been described and exemplified in terms of its preferred embodiment, those skilled in the art will appreciate that modifications can be made without departing from the spirit and scope of this invention.

What is claimed is:

1. A compound having the formula

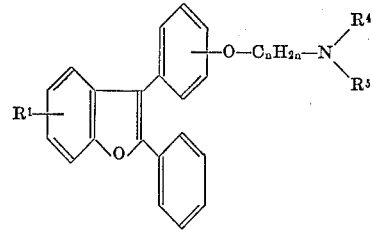

wherein:

$R^1$ is a member selected from the group consisting of (lower)alkoxy, and a radical of the formula

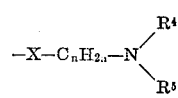

$n$ is a whole integer from 1 to 6 inclusive;
$R^4$ and $R^5$ each represent (lower)alkyl, and when taken together with —N<, constitute pyrrolidino; and
X is a member selected from the group consisting of oxygen and sulfur.

2. A compound having the formula

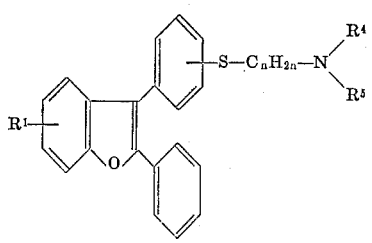

wherein:

$R^1$ is a member selected from the group consisting of (lower)alkoxy, and a radial of the formula

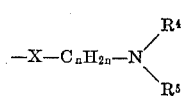

$n$ is a whole integer from 1 to 6 inclusive;
$R^4$ and $R^5$ each represent (lower)alkyl, and when taken together with —N<, constitute pyrrolidino; and
X is a member selected from the group consisting of oxygen and sulfur.

3. A compound having the formula

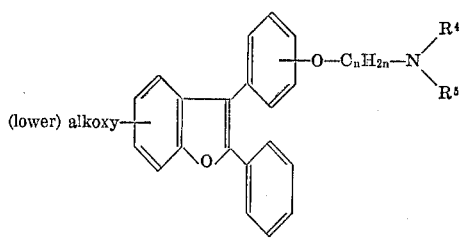

wherein:

$n$ is a whole integer from 1 to 6 inclusive; and
$R^4$ and $R^5$ each represent (lower)alkyl, and when taken together with —N<, constitute pyrrolidino.

4. A compound having the formula

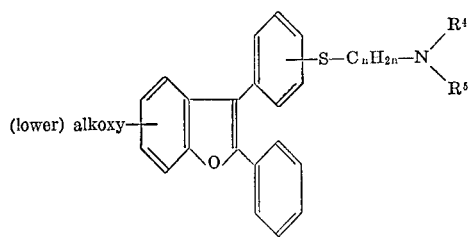

wherein:

$n$ is a whole integer from 1 to 6 inclusive; and
R⁴ and R⁵ each represent (lower)alkyl, and when taken together with —N<, constitute pyrrolidino.

5. The compound having the formula

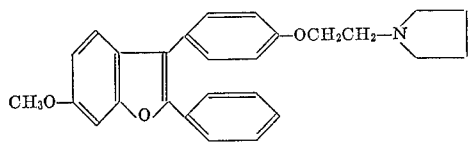

6. The compound having the formula

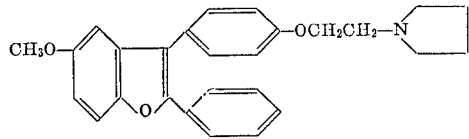

7. The compound having the formula

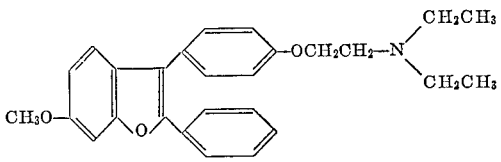

8. The compound having the formula

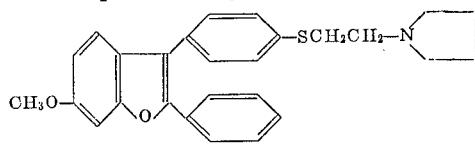

9. The compound having the formula

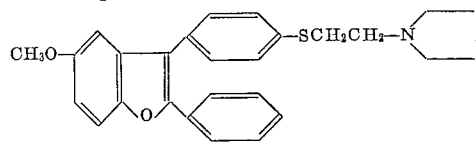

10. The compound having the formula

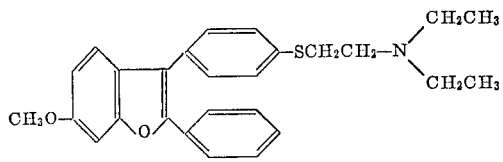

No references cited.

NICHOLAS S. RIZZO, *Primary Examiner.*
JOSE TOVAR, *Assistant Examiner.*